United States Patent Office 3,778,454
Patented Dec. 11, 1973

3,778,454
COMPLEX ESTER
Joseph P. Kleiman, Birmingham, and Larry Plonsker, Troy, Mich., assignors to Ethyl Corporation, Richmond, Va.
No Drawing. Filed Feb. 18, 1970, Ser. No. 12,466
Int. Cl. C07c 69/44; C10m 1/26, 3/20
U.S. Cl. 260—404.8         5 Claims

ABSTRACT OF THE DISCLOSURE

A complex ester lubricant is made by reacting a mole of trimethylolpropane with 0.1–0.3 mole of a $C_{4-10}$ aliphatic dicarboxylic acid and esterifying the remaining hydroxyl groups with $C_{4-12}$ aliphatic monocarboxylic acids having an average carbon chain of about 5–9 carbon atoms. The esters have very low pour points and high viscosity indexes. Certain of the esters have physical properties meeting Navy MIL–L–23699–B and Air Force MIL–L–27502 specifications for esters used in jet aircraft engines.

BACKGROUND

With the development of gas turbine aircraft engines, which must operate at peak efficiency at extremely high altitudes, there has developed needs for lubricants which can endure the extremely high temperatures encountered in these engines for long periods of time and yet remain fluid at the very low temperatures to which these engines are exposed in arctic regions or when the engine is shut down during flight. Engine manufacturers and operations personnel dealing with these engines require a lubricant possessing exceptionally low viscosity at low temperatures and, at the same time, possessing a satisfactory lubricating viscosity at higher temperatures. During the period from about 1940–45, ester lubricants were developed for use primarily in the early turbine engines. The development of these lubricants is described in such publications as Zorn, "Esters as Lubricants," available from the Air Documents Division, T–2 AMC Microfilm No. RC–718 F–18614, Wright Field, Dayton, Ohio, released in July 1947. Until recently, turbojet aircraft have operated at subsonic speeds. The lubrication of turbojet engines in this service has generally been satisfied using diesters of aliphatic dicarboxylic acid such as di-2-ethylhexyl sebacate. Newer aircraft now in service and other aircraft now under development will be required to operate at supersonic speeds requiring higher output turbojet engines. This will place greater stress upon lubricant stability and requires the development of new lubricants which can be used in this service. For example, the Air Force has recently proposed new specifications MIL–L–27502 for a new six centistoke lubricant for use in its advanced aircraft.

SUMMARY

The present invention relates to a new class of acid-terminated complex esters having good stability, low pour points and high viscosity index and which are eminently useful as lubricants for gas turbine engines such as turbojet aircraft engines and stationary turbine engines such as those used in power generation. These are complex esters of trimethylolpropane, aliphatic dicarboxylic acids and aliphatic monocarboxylic acids.

PREFERRED EMBODIMENTS

A preferred embodiment of this invention is a complex ester lubricant made by reacting, under esterifying conditions, in at least one stage:

(A) one mole part of trimethylolpropane,
(B) from about 0.1 to about 0.3 mole parts of a saturated aliphatic dicarboxylic acid containing from about 4–10 carbon atoms, and
(C) sufficient saturated aliphatic monocarboxylic acid containing from about 4–12 carbon atoms in proportion such that the average is from about 5–9 carbon atoms to substantially completely esterify the remaining hydroxyl groups of said trimethylolpropane.

Although the complex esters can be made by mixing all three types of reactants in the proper proportion and then conducting the esterification in one step, it is preferred that the reaction be carried out in two steps. In the first step, the polyol is reacted with the dicarboxylic acid under esterifying conditions until substantially all of the carboxylic acid groups of the dicarboxylic acid are esterified. As a second step, the aliphatic monocarboxylic acid is added and the esterification of the polyol completed. Generally, excess aliphatic monocarboxylic acid is used. The amount that will enter into esterification is controlled by the amount of available hydroxyl groups. Since the dicarboxylic acid will have already esterified part of the available hydroxyl radicals, the amount of aliphatic monocarboxylic acid that will react is fixed. When the hydroxyl content of the final ester is sufficiently low, any excess aliphatic monocarboxylic acid can be removed by washing with an aqueous alkaline solution followed by treatment with alumina, activated charcoal or a combination of such treatments.

Trimethylolpropane used in making the esters is a readily available chemical sometimes referred to as 1,1,1-trimethylolpropane.

The saturated aliphatic dicarboxylic acids useful in making esters are those containing from about 4–10 carbon atoms such as succinic acid, glutaric acid, adipic acid, pimelic acid, suberic acid, azelaic acid and sebacic acid. The amount of aliphatic dicarboxylic acid reacted with the trimethylolpropane can vary from about 0.1–0.3 mole per moles of trimethylolpropane. The preferred range depends on whether the final ester is designed to meet the Navy MIL–L–23699–B specifications or the Air Force MIL–L–27502 specifications. In the former case, the preferred range is from about 0.1–0.2 mole, especially about 0.15 mole, and in the latter case the preferred range is from about 0.2–0.3 mole, especially about 0.25 mole. The most preferred dicarboxylic acid in either situation is adipic acid.

Suitable saturated aliphatic monocarboxylic acids include those having from 4–12 carbon atoms such as n-butyric, isobutyric, n-valeric, isovaleric, 3-methylbutyric, caproic, 2-methylvaleric, enanthylic, 2-methyl caproic, caprylic, 2-methylenanthylic, pelargonic, 3-methyleneanthylic, 2,4-dimethyl caproic, 2-methyl caprylic, capric, lauric, 2-methylundecylic, undecylic, and the like.

The more preferred aliphatic monocarboxylic acidr are the straight chain acids or those in which a substantial amount, at least 50 percent, of the acid is straight chain.

The monocarboxylic acids can all have the same number of carbon atoms or they may be mixtures of acids containing different numbers of carbon atoms from 4–12. The proportion of the different acids in mixtures is such that the average number of carbon atoms per molecule ranges from about 5–9. For example, a mixture of 50 mole percent n-butyric acid and 50 mole percent lauric acid has an average of 8 carbon atoms per molecule. Naturally, if the aliphatic acids are all of the same carbon number this should be between 5 and 9 carbon atoms in order to obtain the required average.

Although the aliphatic monocarboxylic acids containing from 4–12 carbon atoms and having an average of 5–9 carbon atoms give satisfactory results for most applications, particularly preferred aliphatic monocarboxylic acids are those having a straight chain structure. Of these, the most preferred are those containing an even number of carbon atoms from 4–10 carbon atoms in proportion such that the average number of carbon atoms is from 5–9. This results in complex ester lubricants having most desirable viscosity, lubricity and stability properties.

Exceptionally good results are obtained using mixtures consisting essentially of n-hexanoic, n-octanoic and n-decanoic acids. A particularly preferred mixture of such acids is one containing from about 20–30 weight percent n-hexanoic, from 35–50 weight percent n-octanoic, and from 25–35 weight percent n-decanoic acids. The acid mixture is substantially straight chain, but can contain a small amount, up to 5 percent, of branched chain acids without detrimental results. A more preferred mixture consists essentially of 23–29 weight percent n-hexanoic acid, 41–45 weight percent n-octanoic acid, and 28–34 weight percent n-decanoic acid.

A most preferred monocarboxylic acid mixture consists essentially of about 25 weight percent n-hexanoic acid, about 43 weight percent n-octanoic acid, and about 31 weight percent n-decanoic acid.

The complex esters made according to this invention are mixtures of:

(1) complex esters derived from trimethylolpropane, aliphatic dicarboxylic acids and aliphatic monocarboxylic acids, and
(2) aliphatic monocarboxylic acid esters of trimethylolpropane.

The aliphatic monocarboxylic acid esters of the trimethylolpropane result because only from about 0.1 to 0.3 mole parts of the aliphatic dicarboxylic acid are used per mole part of trimethylolpropane. Since only up to 0.3 mole parts of aliphatic dicarboxylic acid are used per mole part of trimethylolpropane, some of the trimethylolpropane will not react with the aliphatic dicarboxylic acid. This unesterified trimethylolpropane reacts with the aliphatic monocarboxylic acid, forming aliphatic monocarboxylic acid esters of the trimethylolpropane. The trimethylolpropane that does react with the aliphatic dicarboxylic acid forms an intermediate partial ester of the polyol which is completed by further reaction with aliphatic monocarboxylic acids to form a complex ester. The exact compositions are not readily defined and cannot be easily determined and, hence, are best described by reference to the process used to make them. However, some insight into their composition can be obtained by the following formula, which is a simplification of the exact structure and does not take into account all possibilities. Most of the complex ester mixture is believed to have the formula:

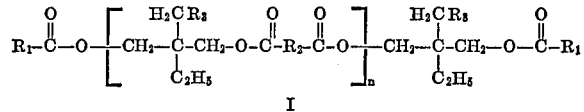

I wherein $n$ has the value from 0 to about 5, $R_1$ is the $C_{3-11}$ saturated aliphatic portion of monocarboxylic acid employed, $R_2$ is the $C_{2-8}$ saturated aliphatic portion of the dicarboxylic acid used, and $R_3$ is the group:

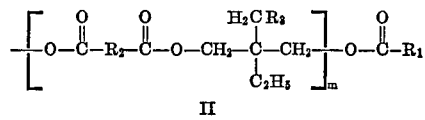

II in which $R_1$, $R_2$ and $R_3$ are as defined above and $m$ is an integer from 0 to about 5.

Since the group represented by Formula II also contains $R_3$ in its definition it allows for an infinite progression of such groups. Actually, because of the low amount of aliphatic dicarboxylic acid employed, the value of $m$ in Formula II is generally 0 when the value of $n$ in Formula I is 1 or greater. There is, of course, the remote possibility that some small amount of quite complex polyesters might be present including branched chain structures, cross-linked structures and even cyclic polyesters. This is the reason the product is defined by the process by which it is made.

The complex mixture is made by reacting, under esterifying conditions, in at least one step, one mole weight of trimethylolpropane, from about 0.1 to 0.3 mole weights of an aliphatic dicarboxylic acid containing about 4–10 carbon atoms, and a sufficient amount of a $C_{4-12}$ aliphatic monocarboxylic acid to substantially complete the esterification of the trimethylolpropane. By esterifying conditions is meant that the reaction is carried out under conditions well known in the art to cause an organic carboxylic acid and an alcohol to form an ester by eliminating a molecule of water. This is generally promoted by heating the mixture containing the organic carboxylic acid and the alcohol. A temperature range of from about 75–250° C. is employed. Preferably, the reaction is carried out at a temperature high enough to cause the water formed to distill out, but not so high as to cause decomposition of the reactants or products. Frequently, removal of the water is facilitated by including a water-insoluble azeotroping solvent in the reaction mixture. Suitable solvents include aliphatic or aromatic hydrocarbons. The aromatic hydrocarbons such as benzene, toluene, xylene, mesitylene, and the like, are especially useful. When these are used esterification is generally conducted at the boiling point of the mixture and the water removed from the distillate by phase separation. The solvent is returned to the reaction mixture until esterification is complete. If higher temperatures are desired using an azeotroping solvent, the reaction can be carried out under pressure sufficient to raise the boiling point of the mixture to the desired reaction temperature.

It is generally desirable, but not required, to carry the reaction out under an inert atmosphere such as nitrogen to minimize peroxide formation.

The esterification rate can be increased by adding an esterification catalyst to the mixture, although this is not required. Acidic catalysts have been found to be useful. These catalysts include sulfuric acid, phosphoric acid, p-toluene sulfonic acid, sodium bisulfate, potassium bisulfate, sulfonated poly-styrene acidic ion exchange resins, and the like. Other useful catalysts include esters of titanium or zirconium such as tetraalkyl titanates or zirconates (e.g., tetraethyl titanate, tetrabutyl titanate, tetra-n-propyl zirconate, etc.). The amount of catalyst is not critical. Only enough is required to promote a reasonable esterification rate. When used, a useful range is from 0.001 to 5 weight percent, based on the weight of the reaction mixture. A preferred catalyst concentration is from 0.1 to 3 weight percent.

As stated previously, the esters can be made in at least one step. In the one-step operation all of the reactants are mixed together in the proper ratio and the mixture placed under esterification conditions until ester formation is substantially complete. The preferred method of making the esters is to employ a two-step process. In this preferred method, the polyol and the aliphatic dicarboxylic acid are first mixed and placed under esterification conditions until the aliphatic dicarboxylic acid is substantially fully esterified. After this, the aliphatic monocarboxylic acid is added and esterification of the polyol is completed. This method permits the use of excess aliphatic monocarboxylic acid in the second step because the amount that will react is limited by the amount of free hydroxyl remaining on the trimethylolpropane.

The esterification is generally conducted until the hydroxyl number of the mixture is reduced below about 5. Following this, the ester can be subjected to various treatments to remove undesirable material. Solvents or excess aliphatic carboxylic acids can be removed by heating the ester, preferably under vacuum, to a temperature high enough to cause them to distill out. Temperatures of from 100–250° C. at vacuum under 50 mm. of Hg, preferably under 10 mm. of Hg, are usually sufficient. Residual acid can be removed by washing the ester with an aqueous base such as alkali metal hydroxides, carbonates or bicarbonates, for example, sodium hydroxide, potassium hydroxide, sodium bicarbonate sodium carbonate. Sodium hydroxide is preferred. Alternatively, the ester can be first washed with aqueous base prior to distilling out the solvent. This latter method allows the removal of residual water with the solvent. Further drying of the ester can be accomplished by treatment with any of the known drying agents such as anhydrous sodium sulfate. It is generally desirable to subject the final ester to further treatment with an adsorbent material such as activated clay, alumina or charcoal, to remove trace acids and other impurities.

The methods of making the esters are readily understood from the following examples. All parts are by weight unless otherwise specified.

Example 1

In a reaction vessel equipped with heating and stirring means was placed 134 parts of trimethylolpropane and 36.5 parts of adipic acid. While stirring, the mixture was heated to 220° C. and maintained at this temperature for 4 hours. During this period, nitrogen was passed through the vapor phase whereby any water evolved was removed. Following this, the mixture was cooled and 400 parts of an acid mixture having the composition 26 weight percent n-hexanoic acid, 43 weight percent n-octanoic acid and 31 weight percent n-decanoic acid was added. While stirring, the mixture was heated to a temperature of 220–240° C. and maintained in this temperature range for 14 hours. Following this, the reaction mixture was diluted with hexane and given two caustic washes and then water washed until neutral. The washed mixture was filtered and then the hexane and other volatiles removed by distillation under reduced pressure (1 mm. Hg). The product was an excellent base lubricant having physical properties making it useful when formulated as a lubricant for turbojet engines.

Example 2

In a reaction vessel as described in Example 1 was placed 21.9 parts of adipic acid and 134 parts of trimethylolpropane. While stirring, the mixture was heated to 215° C. and was maintained at 215–225° C. for 6 hours while distilling out evolved water. Following this, the mixture was cooled and 430 parts of an aliphatic monocarboxylic acid mixture was added. The mixture consisted essentially of 26 weight percent n-hexanoic acid, 43 weight percent n-octanoic acid and 31 weight percent n-decanoic acid. While stirring, the mixture was again heated to and maintained at a temperature of 230–240° C. for 8 hours, during which period water was distilled out. The mixture was then cooled, diluted with hexane and washed twice with aqueous caustic. Following this, it was washed with water until neutral and dried over anhydrous calcium sulfate. The dried solution was filtered and then the solvent and other volatiles distilled out under vacuum.

Example 3

In a reaction vessel as described in Example 1 was placed 20.2 parts of sebacic acid and 134 parts of trimethylolpropane. While stirring, the mixture was heated to about 230° C. and maintained at 230–250° C. for 4 hours. Following this, the mixture was cooled and 430 parts of the same aliphatic monocarboxylic acid mixture used in Example 2 was added. The mixture was heated to about 200° C. and water that evolved was collected in a Dean Stark water trap, in which the trap had been filled with xylene. The temperature was slowly raised to 240° C. and maintained at 240° C. for 8 hours while removing water of esterification. The final complex ester was recovered in the same manner as in Example 2.

Good results can also be obtained following the above procedure but using a small amount of an acid catalyst such as sulfuric acid or potassium bisulfate in the esterification mixture. Also, the amount of sebacic acid employed can be varied from the 0.1 mole part used in the above example up to about 0.3 mole part with good results.

Example 4

In the reaction vessel employed in Example 1 was placed 23.5 parts of azelaic acid and 134 parts of trimethylolpropane. The mixture was heated to about 230° C. and maintained at this temperature for 6 hours while distilling out water. The mixture was then cooled and 430 parts of the aliphatic monocarboxylic acid mixture employed in Example 2 was added. The mixture was again heated while removing water using the Dean Stark separator. The temperature rose to about 230° C. The mixture was stirred at 230–240° C. for an additional 8 hours to complete esterification. The final reaction mixture was then treated in the same manner as in the previous examples by diluting with hexane, caustic washing, water washing, drying, filtering, and distilling out water and other volatiles, to leave a useful complex ester lubricant.

Other aliphatic monocarboxylic acids and acid mixtures can be employed following the procedure of the above example with good results. For example, good results are obtained using n-octanoic acid.

Example 5

In the reaction vessel described in Example 1 was placed 26.1 parts of suberic acid and 134 parts of trimethylolpropane. While stirring, the mixture was heated and maintained at 220–230° C. for 3 hours while removing water. The mixture was then cooled to about 140° C. and 430 parts of the same mixture of 26 weight percent n-hexanoic acid, 43 weight percent n-octanoic acid and 31 weight percent n-decanoic acid was added. The mixture was again heated and after 3 hours the temperature reached 220° C. Heating was continued at 220–235° C. for 12 hours, during which period water was removed. The product was then cooled, washed with aqueous caustic and then with water. It was then dried over anhydrous calcium sulfate and filtered, following which the volatiles were removed by heating to about 130° C. at about 1 mm. Hg.

Example 6

In the reaction vessel of Example 1 was placed 146 parts of adipic acid, 536 parts of trimethylolpropane and 46 parts of xylene. The mixture was heated and water removed from the distillate employing a Dean Stark separator. The temperature was slowly raised to 220° C. and maintained at this temperature for 6 hours. Following this, the mixture was cooled and 1600 parts of a mixture consisting essentially of 26 weight percent n-hexanoic acid, 43 weight percent n-octanoic acid and 31 weight percent n-decanoic acid was added. While stirring, this mixture was heated to about 240° C. and maintained at this temperature for 13 hours. Infrared inspection showed that substantially all the hydroxyl groups had been esterified. The final product was diluted with petroleum ether and washed twice with aqueous caustic. It was then washed with water until neutral, following which it was filtered. It was then heated to about 150° C. at 1 mm. Hg to remove residual water, solvent and other volatiles. The resultant product was a useful turbine lubricant.

Example 7

In the reaction vessel of Example 1 is placed 134 parts of trimethylolpropane, 29.2 parts of adipic acid and 5 parts of potassium bisulfate. The mixture is stirred and heated to 200° C. and maintained at 200–220° C. for 4 hours while distilling out evolved water. It is then cooled to 100° C. and 390 parts of n-octanoic acid added. It is again stirred and heated to 200° C. and, over a 4 hour period, the temperature gradually raised to 235° C. It is held at this temperature for 2 additional hours while distilling out water and then cooled, diluted with hexane and washed twice with aqueous caustic. It is then water washed until neutral and dried by passing through an activated alumina column. Ten parts of activated charcoal are added to the resultant product and the mixture is heated to 100° C. and stirred for 30 minutes. It is then filtered and hexane and other volatiles removed by distillation at 1 mm. Hg up to 135° C. Following this, it is given a final filtration and the resultant product is a useful base ester lubricant.

In the foregoing examples, other mixtures of saturated aliphatic monocarboxylic acids can be employed to give useful products. Some examples of such acid mixtures are:

(1)

| | Percent |
|---|---|
| Isobutyric acid | 10 |
| n-Valeric acid | 15 |
| 2-ethylhexanoic acid | 40 |
| n-Heptanoic acid | 20 |
| Lauric acid | 15 |

(2)

| | |
|---|---|
| n-Hexanoic acid | 50 |
| n-Octanoic acid | 50 |

(3)

| | |
|---|---|
| n-Valeric acid | 50 |
| n-Hexanoic acid | 30 |
| 2-ethylhexanoic acid | 20 |

(4)

| | |
|---|---|
| n-Hexanoic acid | 23 |
| n-Octanoic acid | 43 |
| n-Decanoic acid | 34 |

(5)

| | |
|---|---|
| n-Hexanoic acid | 20 |
| n-Octanoic acid | 45 |
| n-Decanoic acid | 35 |

(6)

| | |
|---|---|
| n-Hexanoic acid | 30 |
| n-Octanoic acid | 45 |
| n-Decanoic acid | 25 |

(7)

| | |
|---|---|
| n-Hexanoic acid | 30 |
| n-Octanoic acid | 35 |
| n-Decanoic acid | 35 |

(8)

| | |
|---|---|
| n-Hexanoic acid | 25 |
| n-Octanoic acid | 50 |
| n-Decanoic acid | 25 |

Likewise, other aliphatic dicarboxylic acids can be substituted in each example on an equal mole basis. It is also sometimes advantageous to use mixtures of the aliphatic dicarboxylic acid. Suitable mixtures of aliphatic dicarboxylic acids include:

(1)

| | Percent |
|---|---|
| Succinic acid | 10 |
| Glutaric acid | 20 |
| Adipic acid | 50 |
| Pimelic acid | 20 |

(2)

| | |
|---|---|
| Succinic acid | 5 |
| Sebacic acid | 95 |

(3)

| | |
|---|---|
| Adipic acid | 50 |
| Sebacic acid | 50 |

(4)

| | |
|---|---|
| Succinic acid | 10 |
| Adipic acid | 40 |
| Azelaic acid | 50 |

As stated earlier, many of the esters of this invention meet military physical property requirements for jet engine lubricants. The following table shows these requirements together with the physical properties of some representative esters prepared in the previous examples.

| | Example | | | |
|---|---|---|---|---|
| | 2 | 3 | 4 | 5 |
| MIL-L-23699-B: | | | | |
| Visc. at 210° F. (cs.) | 5-5.5 | 5.13 | 4.89 | 4.97 | 5.25 |
| Visc. at 100° F. (cs.) | ¹25 | 25.67 | 23.54 | 24.41 | 26.06 |
| Pour point (° F.) | <−65 | <−80 | <−80 | <−80 | <−80 |
| Visc. index | | 144 | 147 | 144 | 148 |

| | Example 6 |
|---|---|
| MIL-L-27502: | |
| Visc. at 210° F. (cs.) | ²6.25   6.1 |
| Visc. at 400° F. (cs.) | ¹1.5   1.6 |
| Pour point (° F.) | <−65   <−80 |
| Visc. Index | 149 |

¹ Minimum. ² Maximum.

It will be noted that some of the viscosity properties for the MIL-L-23699-B esters are slightly lower than the specification. However, these values generally rise slightly when the ester is formulated with the additives normally used in formulated lubricants.

The esters of this invention also have excellent stability properties when formulated with additives normally used in ester lubricants. This was demonstrated in an Oxidation-Corrosion Test carried out at 400° F. Each ester sample was blended to contain 0.8 weight percent phenyl-$\alpha$-naphthylamine, 0.8 weight percent dioctyldiphenylamine, 0.04 weight percent benzotriazole and 2 weight percent tricresylphosphate. Each blend was placed in a test vessel together with weighed and polished copper and iron metal coupons. They were heated to 400° F. and air bubbled through the blend at a rate of 5 liters per hour over a 72 hour period. At the end of the test the weight loss of the coupons and the acid number, percent viscosity increase, pentane insolubles and visual appearance of the ester were determined. The following table lists the results obtained with some of the esters prepared in the previous examples.

| Ester from Example | Wt. loss (mg./cm.²) | | Acid No. | Percent viscosity increase | Percent pentane insol. | Visual |
|---|---|---|---|---|---|---|
| | Cu | Fe | | | | |
| 2 | +0.1 | 0 | 0.7 | 9 | 0.021 | A |
| 3 | +0.1 | 0 | 0.8 | 11 | 0.025 | A |
| 4 | 0 | 0 | 1.0 | 10 | 0.023 | A |
| 5 | 0 | 0 | 1.2 | 11 | 0.123 | A |

In the above table, a visual rating is on a scale from A to E, in which A is clear.

As these results show, not only do the esters have excellent physical properties meeting the specification for both MIL-L-23699-B and MIL-L-27502 ester lubricants for jet engines, but they also possess exceptional high temperature oxidative stability.

In preparing turbine lubricants using the esters of this invention it is preferred to include other additives to improve the properties of the lubricants. These include antioxidants, metal passivators, extreme pressure agents, antifoam agents, and the like. A useful antioxidant range is from 0.1 to 5.0 weight percent. The preferred antioxidants include:

phenothiazine
phenyl-$\alpha$-naphthyl amine
phenyl-$\beta$-naphthyl amine
dioctyldiphenyl amine
N-alkylphenothiazines
dipyridyl amine
5-ethyl-10,10-diphenylphenazasilane
3,7-dialkylphenothiazines
diphenyl amine
dinaphthyl amine
butyl-$\alpha$-naphthyl amine
ditolyl amine
phenyl tolyl amine tolyl naphthyl amine
dicyclohexyl amine
diphenyl-p-phenylene diamine
4-tert-butyl catechol
2,6-di-tert-butyl-p-cresol
hexyl gallate
tri-nonylphenyl phosphite
polymerized trimethyl dihydroquinone
p,p'-dioctyl diphenyl amine
octylphenyl-β-naphthyl amine
octylphenyl-α-naphthyl amine
p-amino diphenyl amine
o-aminophenol
hydroxy diphenyl amine
dodecyl aniline
3-pentadecyl-4-aminophenol
10-methyl-3,7-dioctyl phenothiazine
10-n-octyl-3,7-dioctyl phenothiazine
10-phenyl-3,7-dioctyl phenothiazine
10-tolyl-3,7-dioctyl phenothiazine
10-cyanoethyl-3,7-dioctyl phenothiazine
10-cyanobutyl-3,7-dioctyl phenothiazine
10-benzyl-3,7-diisopropoxy phenothiazine
10-benzyl-3,7-dibutoxy phenothiazine Metal passivators are used in concentrations from 0.001 to 2.0 weight percent. Useful metal passivators include:

1,4-dihydroxy anthraquinone
1-salicylalaminoguanidine
benzotriazole
benzimidazole
butylbenzothiazole
methylene-bis-benzotriazole
$C_{14-18}$ aliphatic carboxylic salt of 1-salicylalaminoguanidine
polyhydroxyanthraquinone
N,N'-disalicylidene-1,2-propane diamine
N,N'-disalicylidene-1,2-ethane diamine
quinizarin
alizarin Extreme pressure agents are used in concentrations from 0.1 to 5.0 weight percent. Typical extreme pressure agents are the esters of acids of phosphorus including triarylphosphates such as triphenylphosphate, tricresylphosphate, phenyldicresylphosphate, tritolylphosphate and the trialkylphosphates and phosphonates such as tri-n-butylphosphate, tri - (2 - ethylhexyl)phosphate, trimethylcyclohexylphosphate, tri-butylphosphonate, tri - (β - chloroisopropyl)phosphonate, and the like.

Silicones such as dimethyl silicone, diethyl silicone, and the like, are used in small amounts, from about 1 to 50 p.p.m., to inhibit foam.

The following examples illustrate the blending of typical turbine lubricants using the esters of this invention.

Example 8

In a blending vessel is placed 100 parts of the ester prepared in Example 2. To this is added one part of phenyl-α-naphthyl amine, one part of dioctyldiphenyl amine, 0.1 part of a fatty acid salt of 1-salicylalaminoguanidine, 0.02 part of 1,4-dihydroxy anthraquinone, 3 parts of tricresylphosphate and 5 p.p.m., based on the total, of dimethyl silicone. The mixture is stirred until homogenous and then filtered through a fine filter, resulting in an ester lubricant suitable for use in lubricating turbine bearings.

Example 9

In a blending vessel place 1000 parts of the ester made in Example 6, 50 parts of tricresylphosphate, 30 parts of 3,7-dioctylphenothiazine, 1 part of quinizarin and 0.05 part of dimethyl silicone. Stir the mixture until homogenous and then filter, giving a suitable formulated ester lubricant.

Example 10

In a blending vessel place 1000 parts of the ester made in Example 5, 10 parts of phenyl-α-naphthyl amine, 10 parts of dioctyldiphenyl amine, 5 parts of benzotriazole and 20 parts of tricresylphosphate. Stir the mixture until homogenous and filter to obtain a synthetic lubricant suitable for use in turbine engines.

Although the principal use for the ester blends described herein is as lubricants for turbine engines, they are also eminently useful in other applications. For example, they are readily thickened by fatty acid soaps such as the alkali or alkaline earth metal stearates to form synthetic ester greases. Addition of about 10–20 weight percent of lithium stearate to the hot ester followed by cooling gives a useful synthetic ester based grease.

They are also useful as plasticizers in a wide range of plastics. For example, adding 5–50 parts per 100 of ester to a calendering grade of polyvinyl chloride resin gives a useful flexible PVC product.

They are also useful in various specialty applications which require a liquid that does not freeze and maintains good flow characteristics over a wide temperature range. For example, they can be used as damping fluids in instruments having moving parts that require damping such as compasses. Another example is their use as the liquid in bubble type levels. They can also be used as fluid in hydraulic shock absorbers.

Useful automatic transmission fluids are readily formulated from the ester blends by addition of an antioxidant such as phenyl-β-naphthyl amine, a wear agent such as tricresylphosphate, and a small amount of a methyl silicone foam agent.

The esters can be used to lubricate internal combustion engines including both spark ignited and diesel engines. In this use they can be used as the sole base stock or they can be blended with mineral lubricating oils to obtain the desired properties at the least cost. In this use, typical additives can be included such as zinc dialkyldithiophosphates, calcium sulfonates, barium salts of phosphosulfurized high molecular weight olefins and dispersants such as high molecular weight alkenyl succinimides and succinamides of ethylenepolyamines such as tetraethylenepentamine and mixtures thereof.

We claim:

1. A complex ester lubricant made by reacting, under esterifying conditions, in a first stage:
    (A) one mole part of trimethylolpropane, and
    (B) from about 0.1 to about 0.3 mole parts of adipic acid until said adipic acid is substantially fully esterified, and
   in a second stage reacting with the resultant intermediate:
    (C) sufficient saturated aliphatic monocarboxylic acid mixture consisting essentially of 20–30 weight percent n-hexanoic acid, 35–50 weight percent n-octanoic acid and 25–35 weight percent n-decanoic acid to substantially completely esterify the remaining hydroxyl groups of said trymethylolpropane,
   said complex ester having a pour point below about −65° F. and a viscosity at 210° F. of about 5 to 6.25 centistokes.

2. A complex ester of claim 1 wherein about 0.15 mole parts of said adipic acid is reacted with said trimethylolpropane in a first esterification stage and then said remaining hydroxyl groups are substantially completely esterified with an acid mixture consisting essentially of about 23–29 weight percent n-hexanoic acid, about 41–45 weight percent n-octanoic acid and about 28–34 weight percent n-decanoic acid.

3. A complex ester of claim 2 wherein said acid mixture consists essentially of about 26 weight percent n-hexanoic acid, about 43 weight percent n-octanoic acid and about 31 weight percent n-decanoic acid.

4. A complex ester of claim 1 wherein about 0.25 mole parts of said adipic acid is reacted with said trimethylolpropane in a first esterification stage and then said remaining hydroxyl groups are esterified with an acid mixture consisting essentially of about 23–29 weight percent n-hexanoic acid, about 41–45 weight percent n-octanoic acid and about 28–34 weight percent n-decanoic acid.

5. A complex ester of claim 1 wherein said acid mixture consists essentially of about 26 weight percent n-hexanoic acid, about 43 weight percent n-octanoic acid and about 31 weight percent n-decanoic acid.

References Cited

UNITED STATES PATENTS

| 3,135,785 | 6/1964 | Fritz | 260—485 |
| 3,000,917 | 9/1961 | Babayan | 260—404.8 |

FOREIGN PATENTS

| 915,161 | 1/1963 | Great Britain. |
| 971,901 | 10/1964 | Great Britain. |
| 1,537,892 | 7/1968 | France. |

LEWIS GOTTS, Primary Examiner

D. G. RIVERS, Assistant Examiner

U.S. Cl. X.R.

252—56 S; 260—485 G

PO-1050
(5/69)

UNITED STATES PATENT OFFICE
CERTIFICATE OF CORRECTION

Patent No. 3,778,454        Dated December 11, 1973

Inventor(s) Joseph P. Kleiman and Larry Plonsker

It is certified that error appears in the above-identified patent and that said Letters Patent are hereby corrected as shown below:

Column 3, line 18, "25" should read -- 26 --.
Column 11, in Claim 5, at line 5, "claim 1" should read -- claim 4 --.

Signed and sealed this 23rd day of April 1974.

(SEAL)
Attest:

EDWARD M. FLETCHER, JR.
Attesting Officer

C. MARSHALL DANN
Commissioner of Patents